United States Patent [19]

Farrell et al.

[11] Patent Number: 5,187,587

[45] Date of Patent: Feb. 16, 1993

[54] HANDLING OF COPY SENSITIVE JOBS IN AN ELECTRONIC REPROGRAPHIC PRINTING SYSTEM USING UNIDIRECTIONAL AND BIDIRECTIONAL DELIVERY OF COPIES TO PLURAL BINS

[75] Inventors: Michael E. Farrell, Fairport; John C. Austin, Rochester; Carla J. Kinder, Ontario; James F. Matysek, Fairport, all of N.Y.

[73] Assignee: Xerox Corporation, Stamford, Conn.

[21] Appl. No.: 865,537

[22] Filed: Apr. 9, 1992

Related U.S. Application Data

[62] Division of Ser. No. 590,134, Sep. 28, 1990, Pat. No. 5,128,772.

[51] Int. Cl.⁵ .................. B65H 39/10; H04N 1/23; H04N 1/29
[52] U.S. Cl. .................. 358/296; 271/288; 271/297; 271/305; 271/298; 358/300; 355/313; 355/321
[58] Field of Search .............. 271/287, 288, 297, 298, 271/305; 358/296, 300; 355/308, 313, 316, 321, 322, 323

[56] References Cited

U.S. PATENT DOCUMENTS

4,697,806 10/1987 Horiuchi ........................ 271/288

Primary Examiner—Benjamin R. Fuller
Assistant Examiner—Scott A. Rogers
Attorney, Agent, or Firm—Oliff & Berridge

[57] ABSTRACT

The handling of copy sensitive jobs in an electronic reprographic printing system comprises a unique bindexer sheet routing operation to ensure job integrity when printing copy sensitive jobs using multiset scheduling. A bindexer bin fill pattern is used which is unidirectional and begins at the same bin for each sheet of the set. Job recovery for copy sensitive jobs can include purging and remarking sets and partial sets to a greater extent for copy sensitive jobs than that required for non-copy sensitive jobs. The unique jobs recovery preserves the uniqueness of the copy sensitive jobs while improving the overall job recovery productivity for non-copy sensitive jobs.

4 Claims, 12 Drawing Sheets

COPY SENSITIVE BINDEXER SHEET ROUTING EXAMPLE

| PITCH | SHEET | SET | BINDEXER SCHEDULING | |
|---|---|---|---|---|
| | | | NORMAL | COPY SENSITIVE |
| 1 | 1 | 1 | A | A |
| 2 | 1 | 2 | B | B |
| 3 | 1 | 3 | C | C |
| 4 | 2 | 1 | C | A |
| 5 | 2 | 2 | B | B |
| 6 | 2 | 3 | A | C |
| 7 | 3 | 1 | A | A |
| 8 | 3 | 2 | B | B |
| 9 | 3 | 3 | C | C |

1) EXAMPLE SHOWN IS 3 SET SCHEDULING GROUP.

FIG. 10

HANDLING OF COPY SENSITIVE JOBS IN AN ELECTRONIC REPROGRAPHIC PRINTING SYSTEM USING UNIDIRECTIONAL AND BIDIRECTIONAL DELIVERY OF COPIES TO PLURAL BINS

This is a division of application Ser. No. 07/590,134 filed Sep. 28, 1990 now U.S. Pat. No. 5,128,772.

BACKGROUND OF THE INVENTION

1. Field of the Invention

The present invention relates to a system or electronic reprographics and, more particularly, to a system of electronic reprographics in which copy sensitive jobs are handled in a specific manner.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. The documents can be scanned either by a scanner in the system or by a scanner located elsewhere. When the scanner is located elsewhere, the image signals are transferred via an electronic network input to the system for processing. Image signals obtained are electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner down-time.

For a variety of reasons, operation in an electronic reprographic system can be interrupted. This can be the result of a scanner or printer fault, hardware or software faults, paper misfeed, jam, intentional interruption, memory loss, etc. Upon such an interruption due to scanner fault, the operator, not knowing precisely where the scanner ceased operation, must either scan the entire job over again, initiate scanning at a document believed to precede the last scanned document and remove duplicate sheets from the job, or proof what has been scanned so far. When a crash occurs while the scanner is building a job, documents present in the paper path can be damaged and the integrity of the job cannot be guaranteed.

Copy sensitive jobs, or jobs composed of non-interchangeable, non-uniform sets, each set being unique in some way, can be handled by electronic reprographic systems having an electronic network input. This is possible because the electronic reprographic system has the capability to handle groups of sheets as a distinct set. A plurality of sets can then be processed as a job by the system.

System malfunctions such as faults, jams, etc. can present significant problems in maintaining the integrity of a run in process. Automatic job recovery procedures generally assume a commonality of all sets in a job and compensate for malfunctions by simply completing any partial sets to make up for lost or damaged copies in the set without requiring rejection of sets or partial sets. Because copy sensitive sets are non-interchangeable, such recovery procedures are not adequate when copy sensitive jobs are processed by the system. These jobs must be handled in a special manner. Special handling of the jobs should further be performed both during normal operation of the system and upon recovery from any interruption in system operation.

The related art has disclosed printing systems which include job recovery operations.

U.S. Pat. No. 4,327,993 to Gauronski et al discloses a method and apparatus for performing job recovery in a reproduction machine wherein lost or damaged sheets in a set are remade with little operator intervention. A sensor which counts the number of sheets within a set is shown. A number of different job recovery methods for different problems are shown. A method of recovering from a recirculating document handler jam and a finisher jam are shown. Job recovery includes repriming or adding to copy sheets already in a dedicated tray to make up for lost or damaged copies in the set without having to reject a whole set having partial copies in process or copies destroyed in the operator intervention activity.

U.S. Pat. No. 4,190,354 to Smith et al discloses a copier job recovery system wherein a false bottom buffer tray is used to increase job recovery speed for duplex copies. Lost copy sheets are automatically replaced in proper serial order in the partial copy set by lifting the partial buffer copy set stack up with the false tray bottom and inserting replacement copies under the buffer set.

While the related art recognizes that job recovery can be performed automatically, the art does not differentiate between handling non-copy sensitive jobs and unique copy sensitive jobs.

OBJECTS AND SUMMARY OF THE INVENTION

Accordingly, one object of the present invention is to provide an electronic reprographic system which ensures job integrity when printing copy sensitive jobs.

Another object of the present invention is to provide an electronic reprographic system which maintains the correct sequence of sets at a final job destination.

Another object of the present invention is to provide an electronic reprographic system which provides specific job recovery for copy sensitive jobs.

A further object of the present invention is to provide an electronic reprographic system which specially handles job recovery for copy sensitive jobs without providing unnecessary handling of non-copy sensitive jobs.

To achieve the foregoing and other objects and advantages, and to overcome the shortcomings discussed above, an electronic reprographic system for handling copy sensitive jobs is provided. The system provides unique sheet routing to ensure job integrity when printing copy sensitive jobs. The unique sheet routing includes routing the sheets to a bindexer having a plurality of sorter bins using a uni-directional fill pattern prior to output from the system. The fill pattern begins at the same bin for each sheet of the set. Unique job recovery for copy sensitive jobs comprises the purging of only the sets necessary to maintain a correct sequence of sets at a final job destination. The number of sets or partial sets purged for a copy sensitive job is greater than the number purged for non-copy sensitive jobs since more sets must be remade for copy sensitive jobs. Partial sets for the non-copy sensitive jobs can be completed without requiring the additional purging operation.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

A. The System

Figure 1:
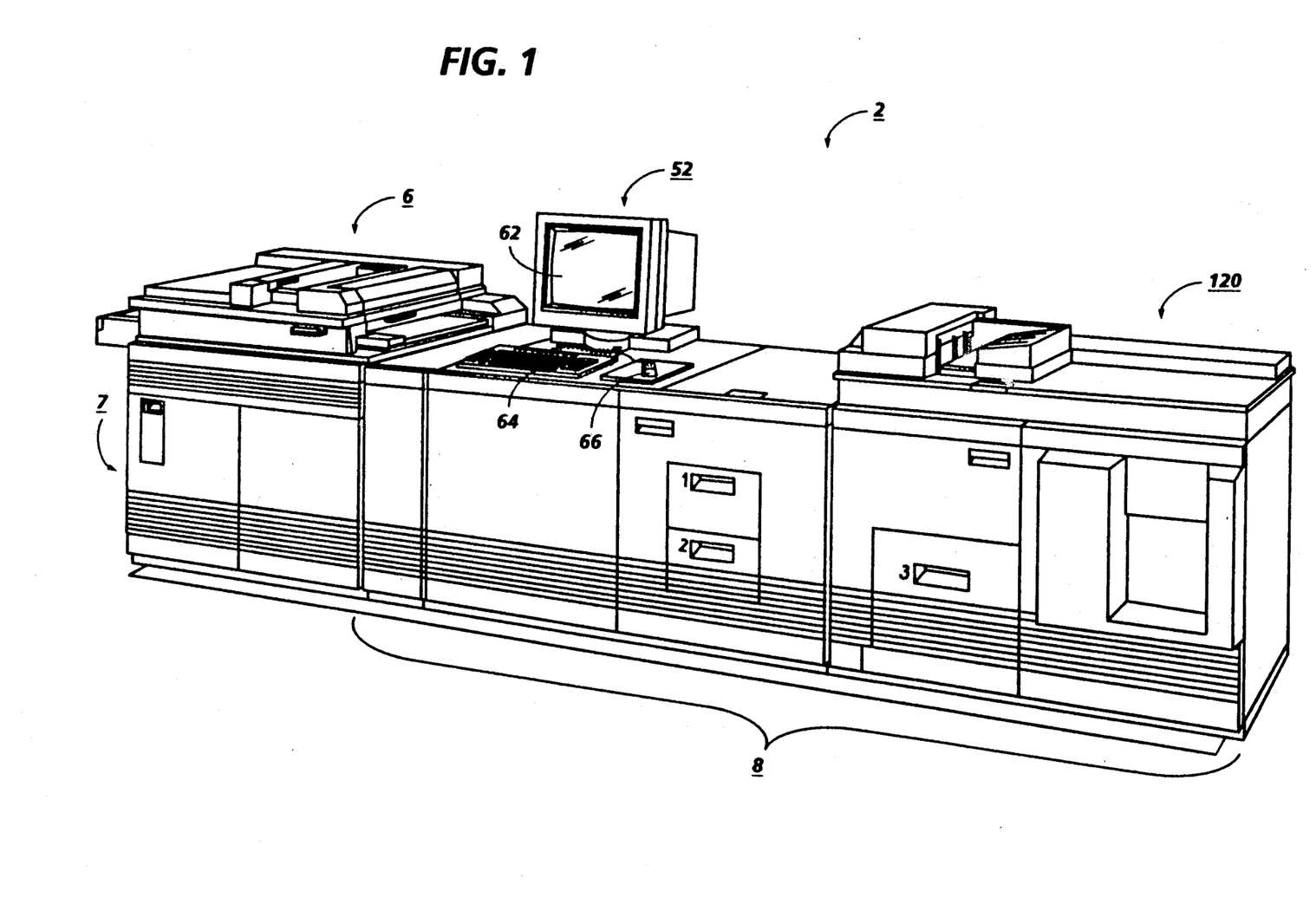
FIG. 1 is a view depicting an electronic printing system incorporating the copy sensitive handling capability system of the present invention.
Figure 2:
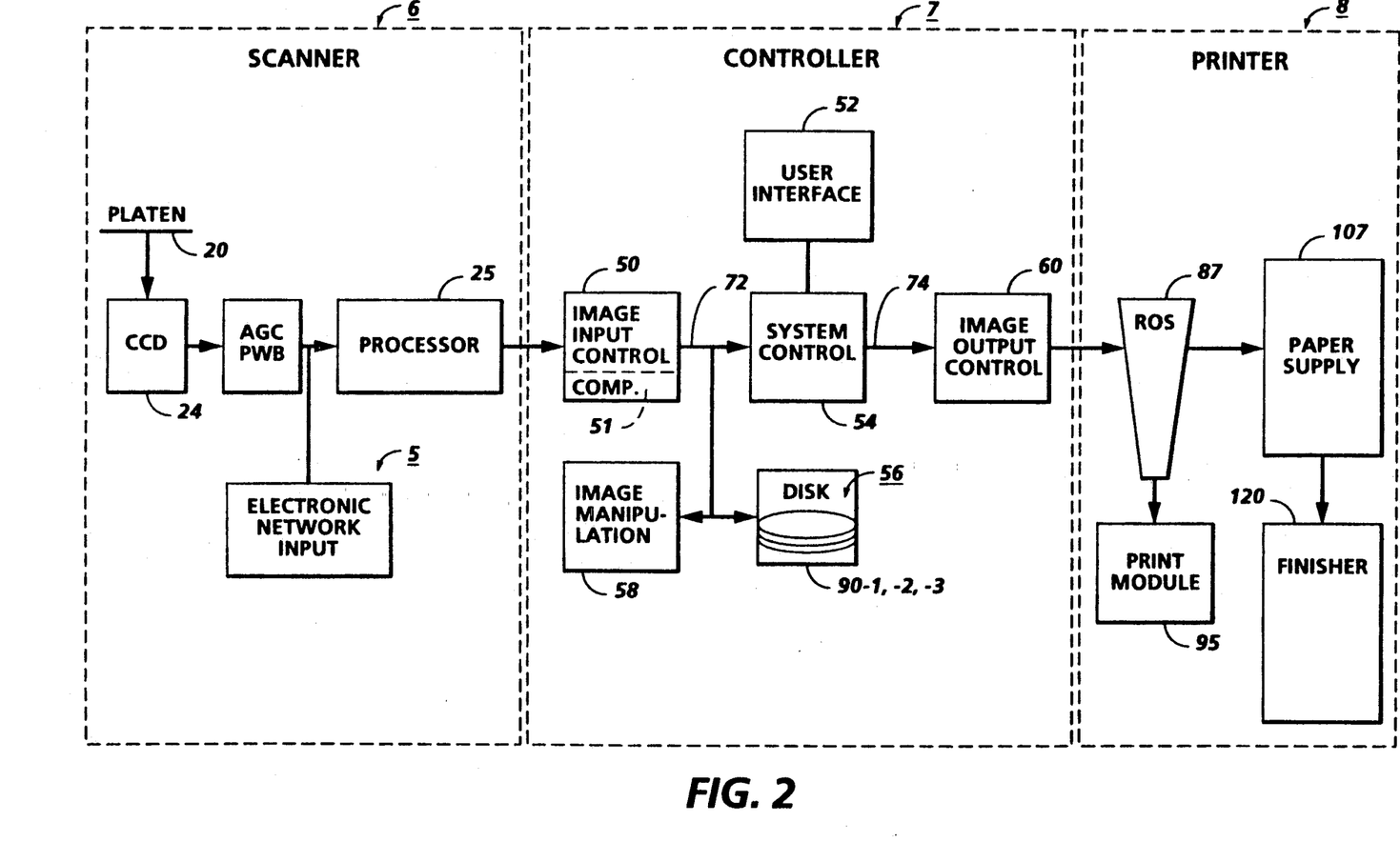
FIG. 2 is a block diagram depicting the major elements of the printing system shown in FIG. 1.

Referring now to the drawings, and particularly to FIGS. 1 and 2 thereof, there is shown an exemplary printing system 2 for processing print jobs in accordance with the teachings of the present invention. Printing system 2, for purposes of explanation, has a plurality of independent services (e.g. scan, print, etc.) which operate asynchronously, with operation being implemented by a shared set of software components. The system 2 provides network, scan and print services enabling both remote input via network 5 and on-site image input via scanner 6. While a specific printing system is shown and described, the present invention may be used with other types of printing systems such as ink jet, ionographic, etc.

Figure 3:
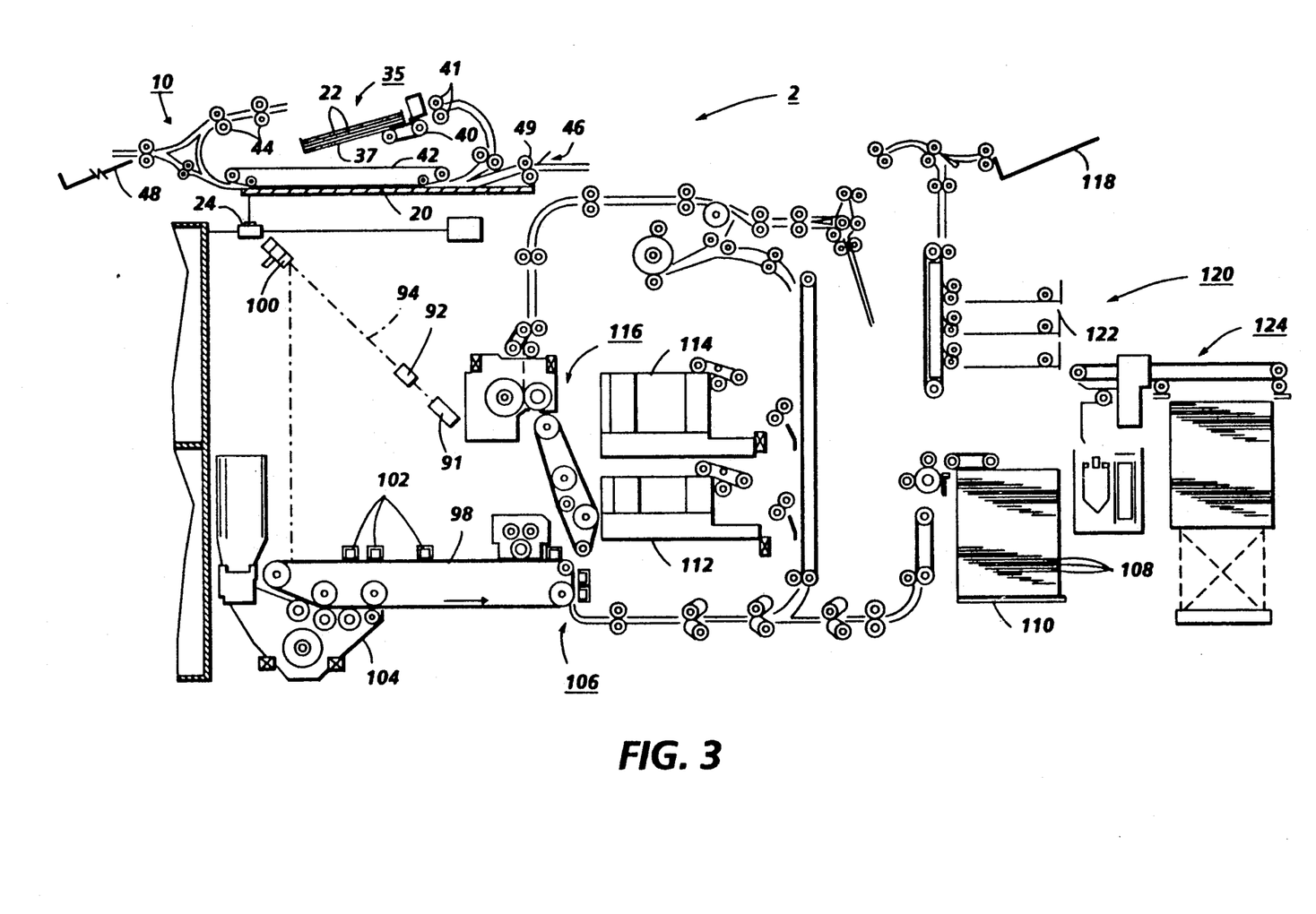
FIG. 3 is a plan view illustrating the principal mechanical components of the printing system shown in FIG. 1.
Figure 4:
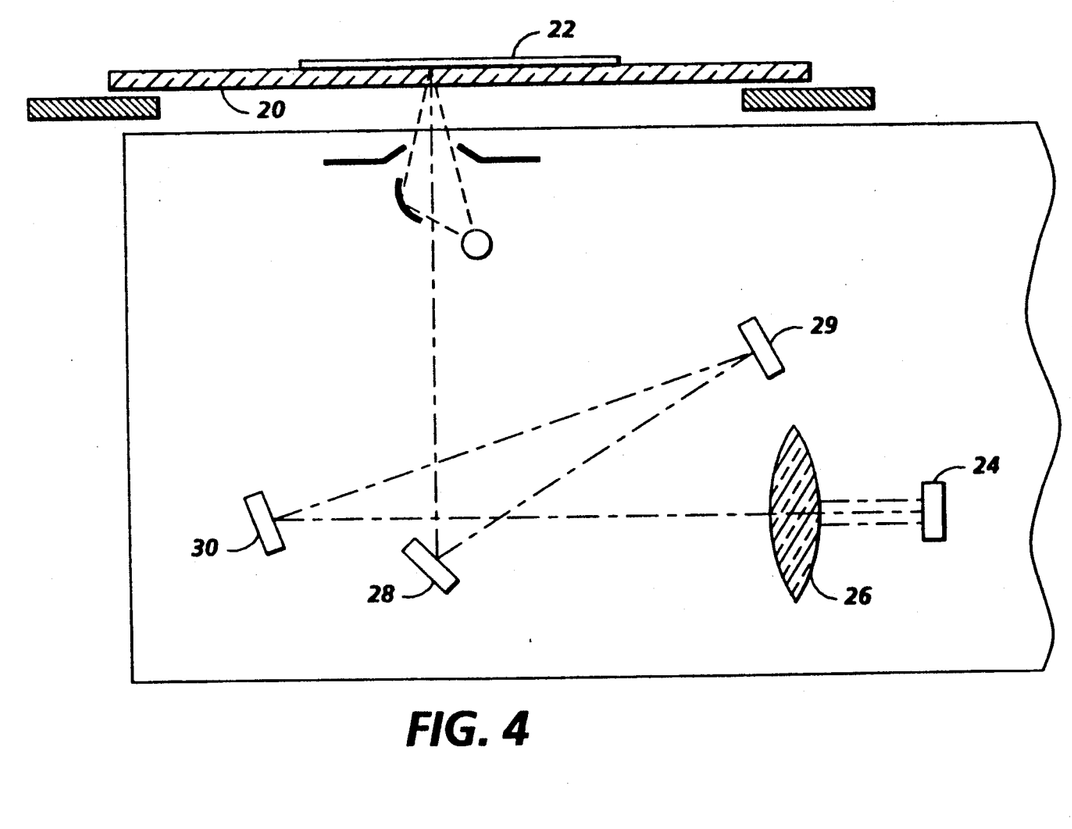
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Alternatively, network 5 provides a suitable communication channel, e.g. a telephone line, to enable image data from one or more remote services to be input to system 2 for processing. Where the Page Description Language (PDL) of the incoming image data is different than the PDL used by system 2, the imaging data from network 5 is converted to the PDL of system 2 before processing. The electronic network input provided by network 5 is used when copy sensitive jobs are being handled by system 2.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

When on-site image input is desired, documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Figure 5A:
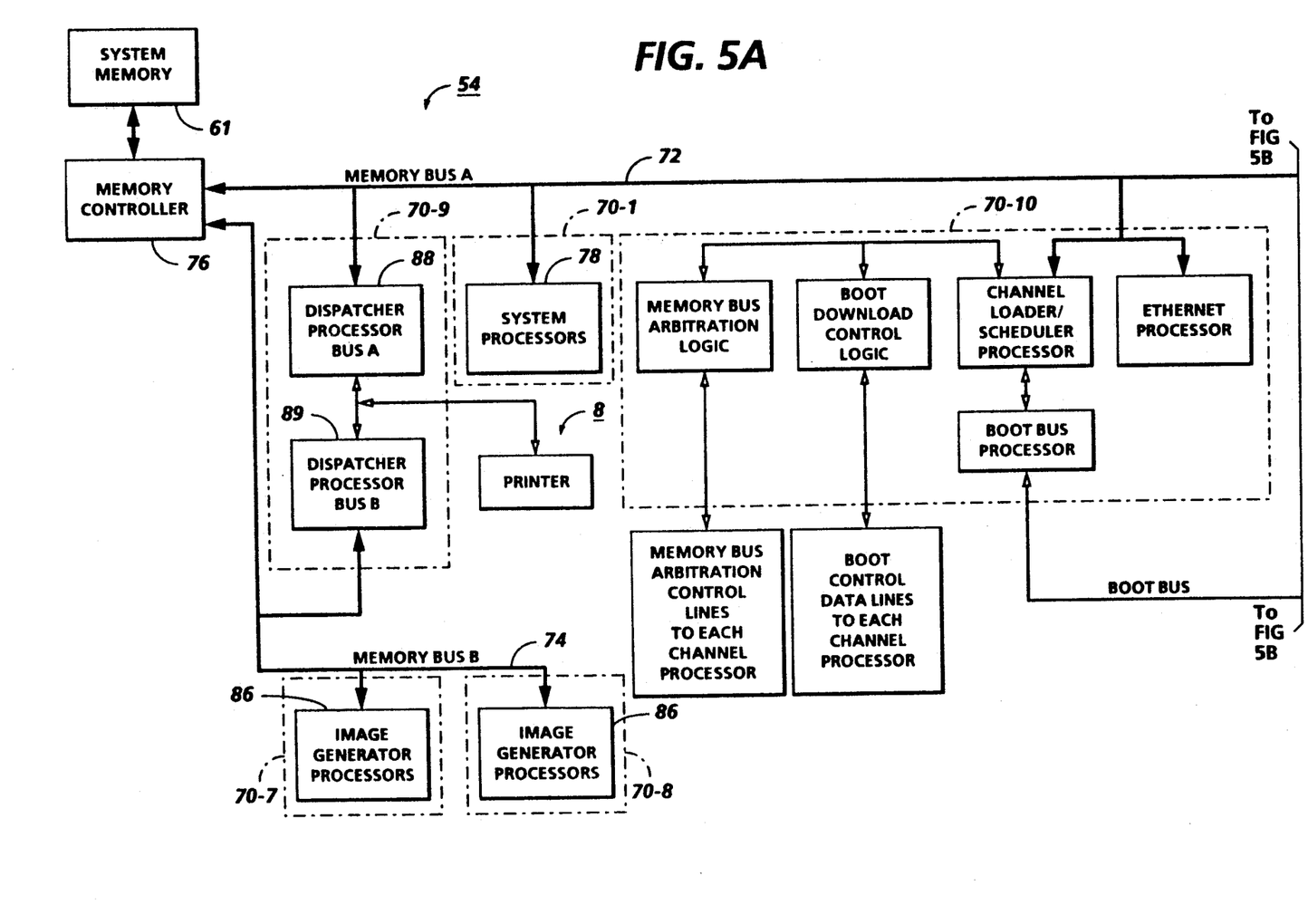
FIGS. 5A, 5B, and 5C comprise a schematic block diagram showing the major parts of the control section for the printing system shown in FIG. 1.
Figure 5B:
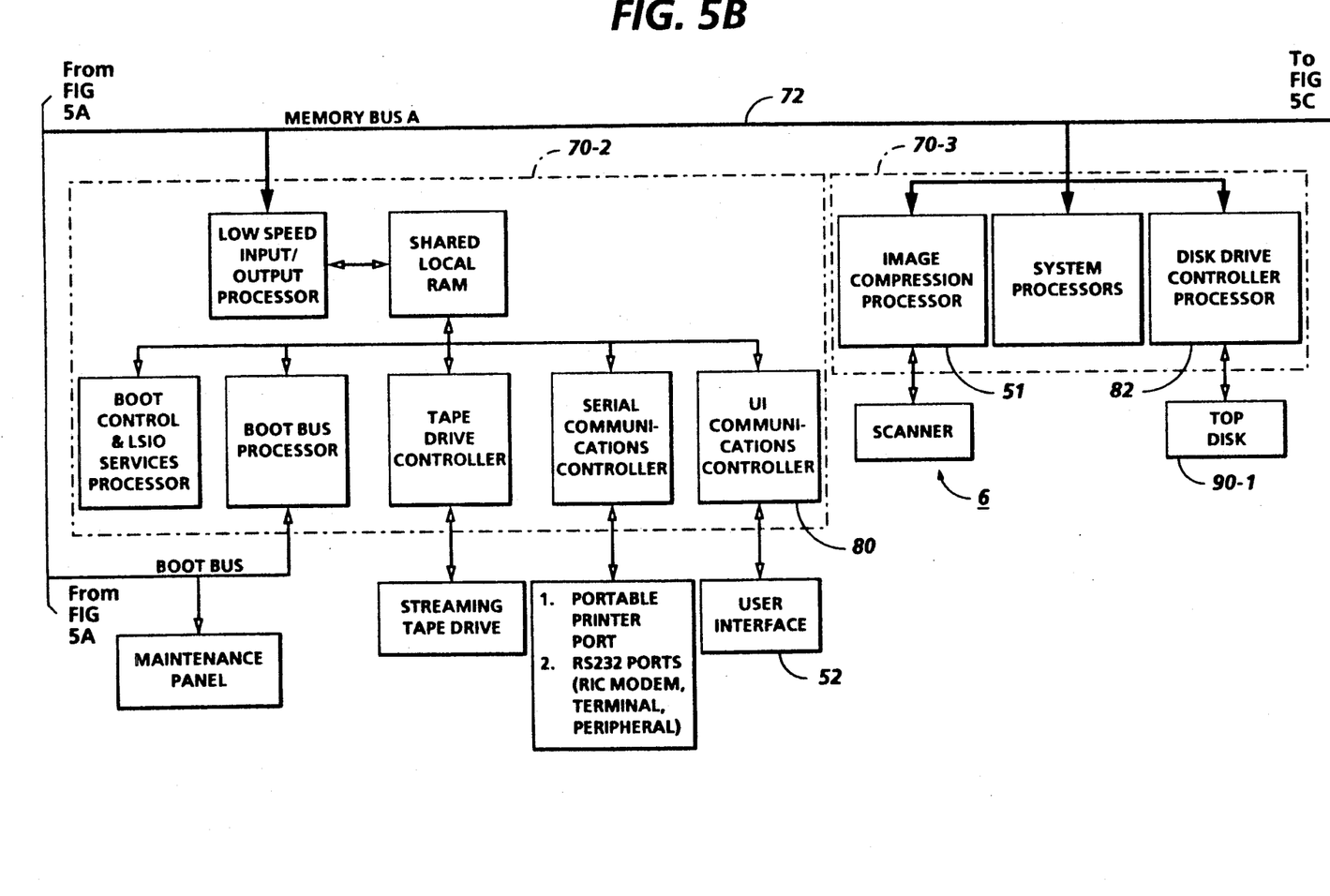
Figure 5C:
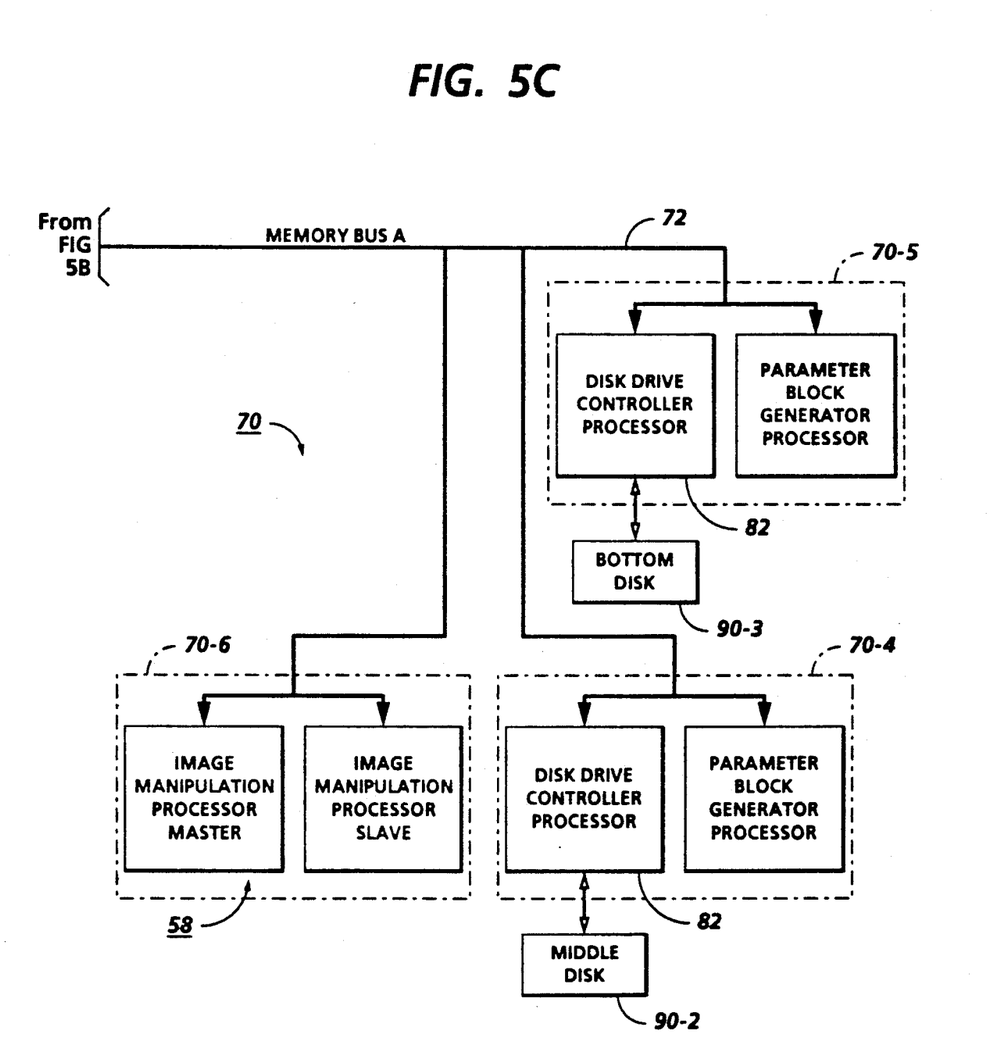

Referring to FIGS. 1, 2 and 5, controller section 7 is, for explanation purposes, divided into an image input controller 50, User Interface (UI) 52, system controller 54, main memory 56, image manipulation section 58, and image output controller 60.

Referring particularly to FIGS. 5A-5C, control section 7 includes a plurality of Printed Wiring Boards (PWB's) 70, PWB's 70 being coupled with one another and with System Memory 61 by a pair of memory buses 72, 74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data is on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
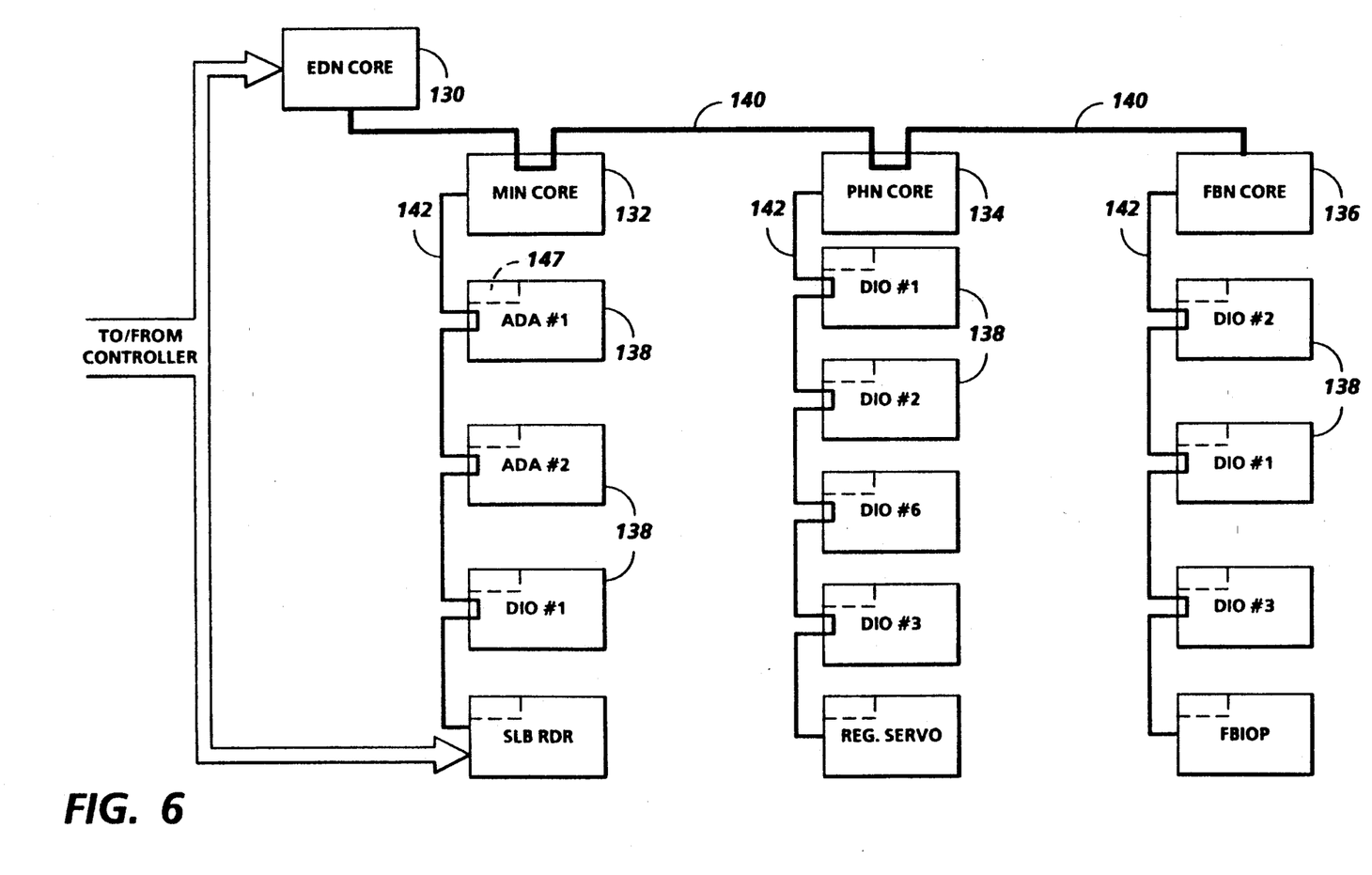
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
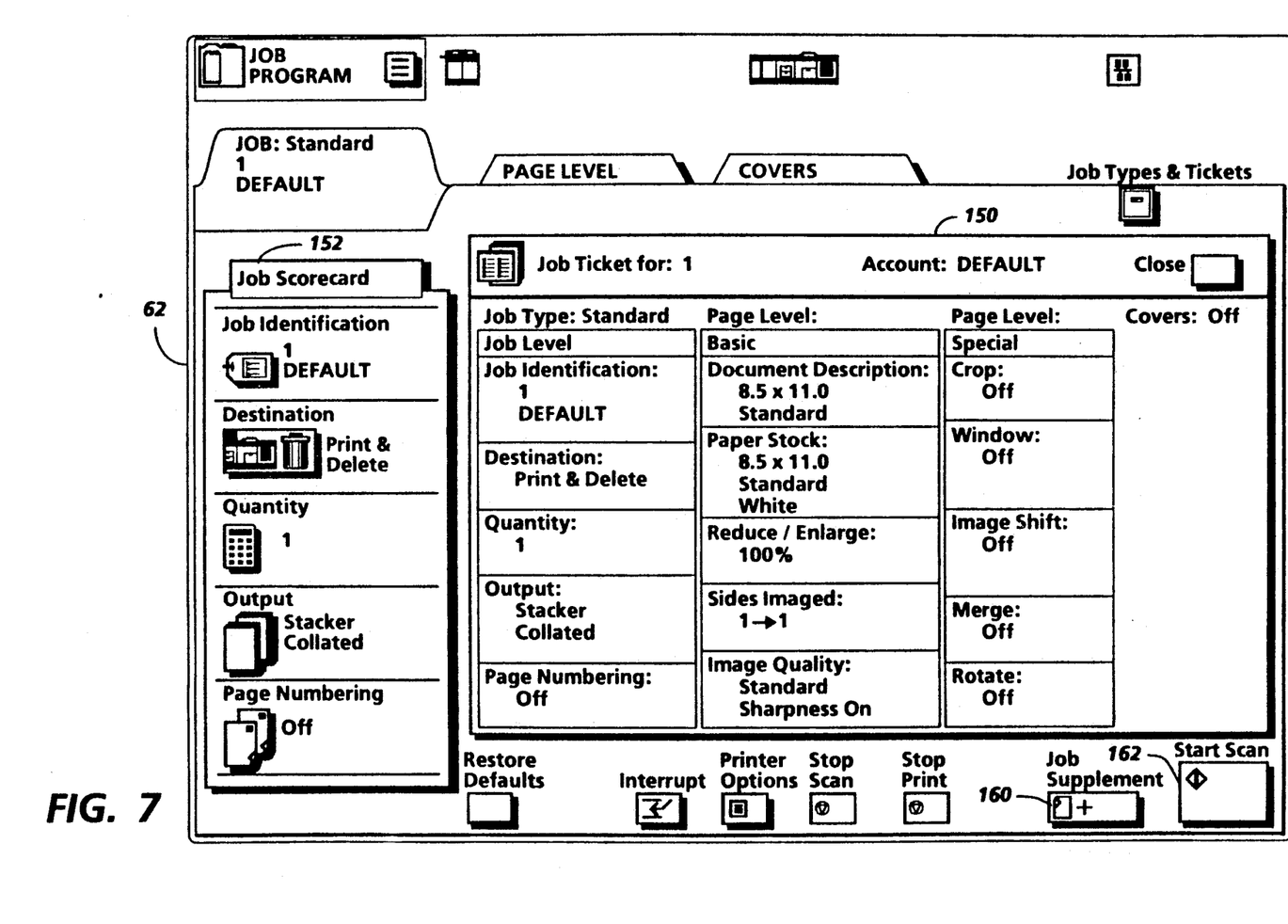
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

B. Routing of Copy Sensitive Jobs

Figure 8:
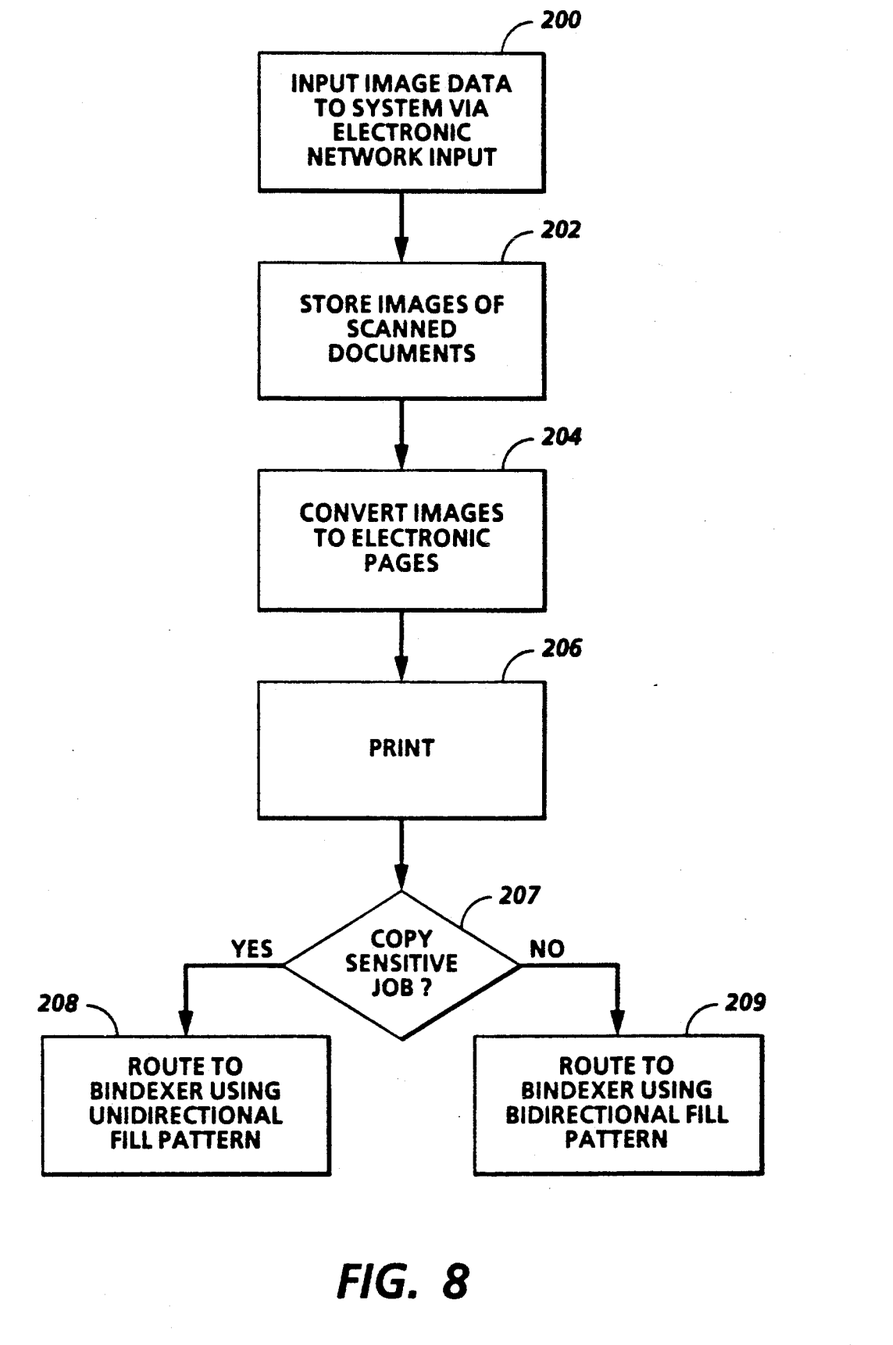
FIG. 8 is a flowchart depicting the operation of the FIG. 1 system to route copy sensitive jobs.

Referring to FIG. 8, there is shown a flowchart depicting the operation of system 2 upon processing of at least one copy sensitive job.

Image data from the sets of original documents which comprise at least one copy sensitive job to be printed is input to system 2 via network 5. The images of the documents are electronically stored in system memory 61 and in main memory 56 (step 202). The images are then transferred to image manipulation section 58 for conversion to electronic pages (step 204). Once the images have been converted to electronic pages, a printing operation can be performed by printer section 8 (step 206). System 2 then determines whether a copy sensitive job is being processed (step 207). Any non-copy sensitive job is processed in one fashion while copy sensitive jobs are processed in another fashion.

System 2 includes a Bindexer as described in U.S. Pat. Nos. 4,782,363 and 4,934,681, the disclosures of which are herein incorporated by reference. The Bindexer is a post-collation device comprising a series of sorter bins inside system 2. Upon delivery of a last sheet of a set, system 2 removes the sets from the bins for output. The Bindexer is used because system 2 has the capability of making more than one set at a time.

Conventional multibin post-collation sorters, including those in which the bins can move up and down as a unit for bidirectional loading, have been known for many years. See, for example, the Xerox Corp. "4500" copier sorter described in U.S. Pat. No. 3,788,640. The sorters provide for loading and collating duplex copy output. In sorters, either the bins can move to reposition a selected bin at the copier output to receive a copy sheet therein, or the sorter can have sheet transports and/or gates that take the sheets from the copier output and then deflect each sheet into a selected stationary bin. Conventional sorter bin loading is directly sequential. There is no skipping past unselected bins during bin loading, or moving or opening bins irregularly, or putting uneven numbers of sheets to be collated in different bins, etc. In conventional sorting only one copy sheet at a time is put in a bin (except for the last bin loaded at the reversal point of a bi-directional sorter, which is then loaded as the first bin), and all the bins being utilized are each sequentially loaded with only one identical copy sheet before any bins are loaded with any different copy sheets.

The printed sets are routed to the Bindexer using multiset scheduling. When a non-copy sensitive job is being processed, the normal Bindexer fill pattern which is bidirectional with a two sheet dwell at each end of the fill sequence, is performed (step 209). If, however, a copy sensitive job is being processed, the normal Bindexer fill pattern is abandoned. Instead, a unique Bindexer fill pattern is employed (step 208). This unique Bindexer bin fill pattern comprises beginning at the same bin for each sheet of a set and proceeding to fill the bins in a unidirectional fashion.

Figure 9:
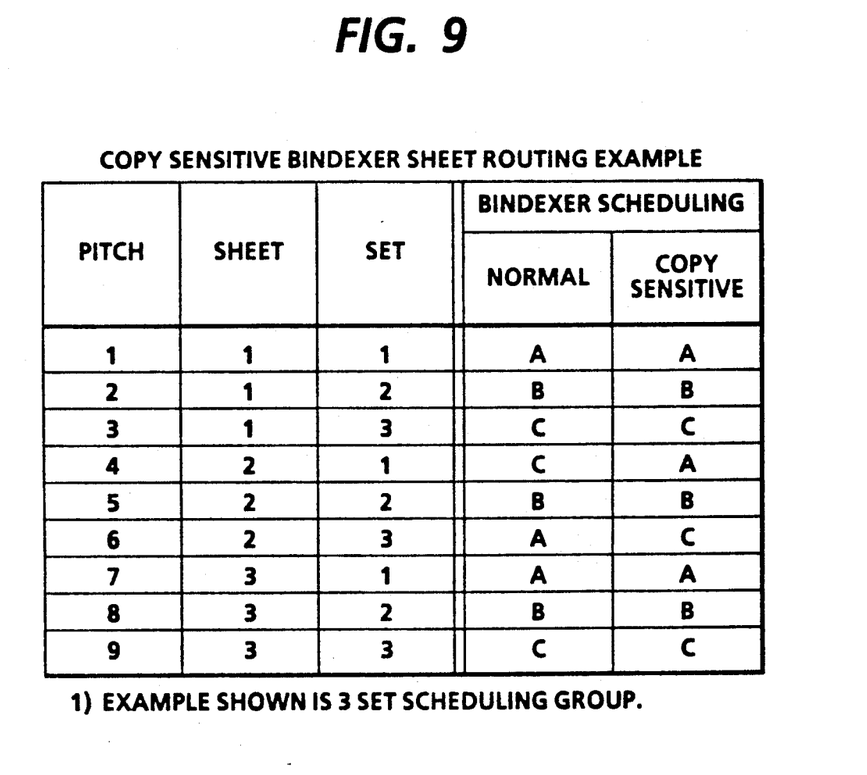
FIG. 9 shows a table illustrating the contrast between a typical fill pattern and a fill pattern for a copy sensitive job according to the present invention.

FIG. 9 is a table illustrating an example of the difference in bindexer fill pattern between normal operation and copy sensitive operation. The example assumes multiset scheduling to three bins in the bindexer. The bins are designated A, B, and C with bin C as the nearest (physically top) bin, bin A as the farthest bin (physically bottom). In both normal and copy sensitive operation, the initial bin fill sequence routes the first sheet of set 1 to bin A, the first sheet of set 2 to bin B, and the first sheet of set 3 to bin C. In normal operation the second sheets of each set would be delivered to each bin in reverse bin sequence; i.e. the second sheet of set 1 is routed to bin C, the second sheet of set 2 is routed to bin B, and the second sheet of set 3 is routed to bin A. However, for copy sensitive jobs, the initial bin fill sequence is repeated; i.e. the second sheet of set 1 is sent to bin A, the second sheet of set 2 is sent to bin B, and the second sheet of set 3 is sent to bin C. In normal operation, the bin fill sequence would continue to reverse after each pass through the bindexer for the duration of the job. In copy sensitive operation, the initial bin fill sequence is maintained for the duration of the job, thereby assuring that all sheets in a specific set are delivered to the same bin and that all sets are delivered in the order originally specified by the printer controller.

While the unidirectional Bindexer bin fill pattern requires additional Bindexer position changes and bin gate actuations, the unidirectional fill pattern ensures the job integrity required when printing copy sensitive sheets.

C. Copy Sensitive Job Recovery

Figure 10:
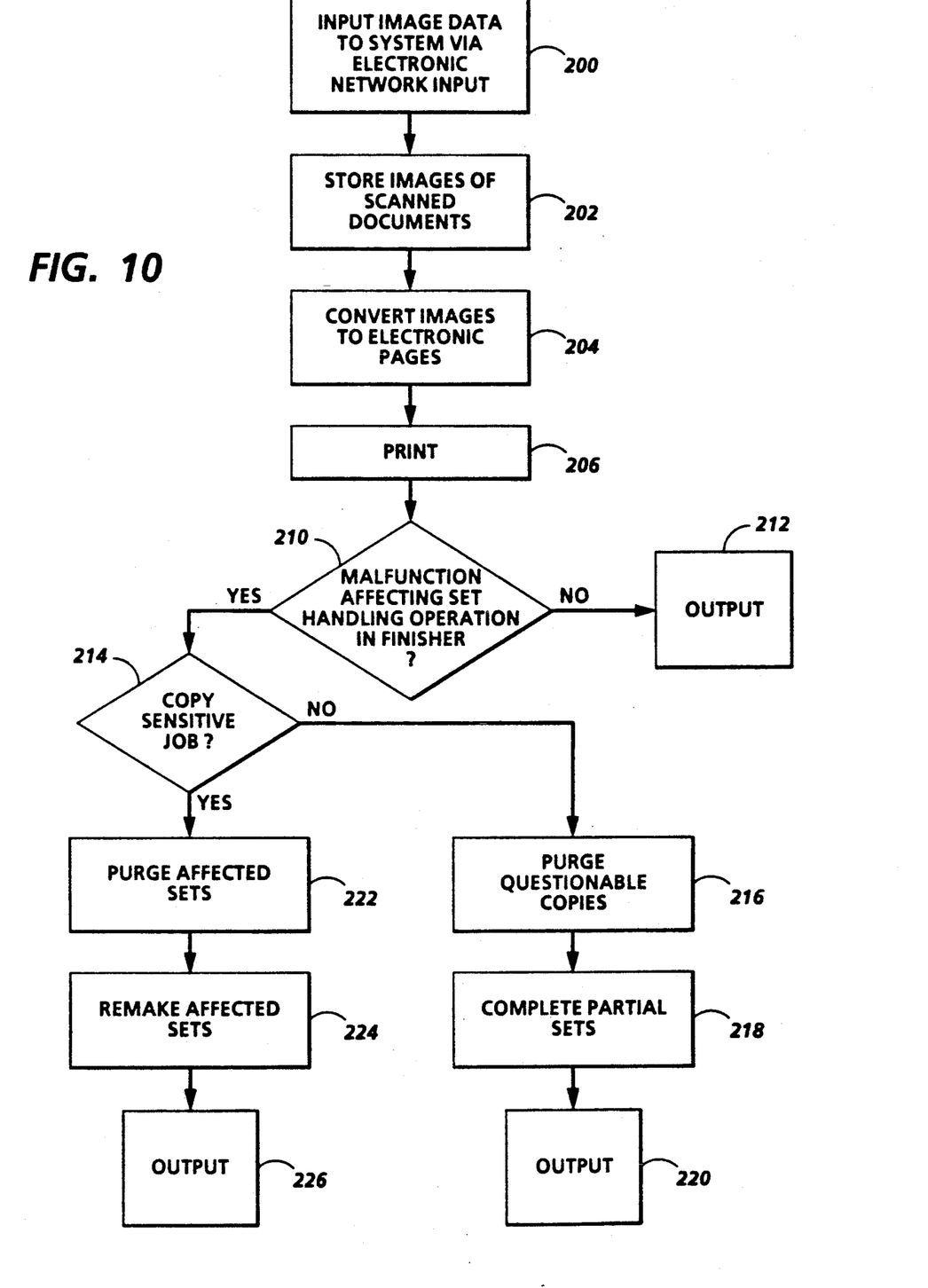
FIG. 10 is a flowchart depicting a job recovery operation according to the present invention.

Referring now to FIG. 10, there is shown a flow chart depicting the job recovery operation of system 2 upon processing of a copy sensitive job. As described with regard to FIG. 8, image data is input to system 2 via network 5 (step 200), images of the scanned documents are stored (step 202) and the images are converted to electronic pages (step 204) for printing (step 206).

The job recovery operation includes monitoring system 2 for any malfunction which would affect the set handling operation in finisher 120 (step 210). If no malfunction is detected, job recovery is not required and system 2 outputs its product (step 212).

If, however, a malfunction is detected, system 2 then determines whether a copy sensitive job is being processed (step 214). Any non-copy sensitive job is processed in one fashion while copy sensitive jobs are processed in another fashion. Non-copy sensitive jobs are processed by first purging questionable copies (step 216), completing any partial sets (step 218) and outputting completed sets (step 220).

Copy sensitive jobs, however, cannot be processed in this manner. Because these jobs have unique features, the affected sets or partial sets, not only the affected copies, must be purged (step 222). The affected sets are then remade (step 224) before being output by system 2 (step 226).

The unique job recovery described with respect to FIG. 10 confines the additional purging required for copy sensitive jobs only to situations when it is necessary. The job recovery productivity is, therefore, improved overall, particularly when both copy sensitive and non-copy sensitive jobs are being processed by system 2. Only the copy sensitive jobs set are remade while the partially completed sets of the non-copy sensitive jobs can simply be completed. The correct sequence of sets required for copy sensitive jobs is maintained at the final job destination.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for processing copy sensitive and copy insensitive jobs in an electronic reprographic printing system, comprising the steps of:

scanning a plurality of sets of original documents which comprises at least one copy sensitive job to be printed;

electronically storing in memory images of the scanned documents;

converting the images to electronic pages for printing;

printing the electronic pages;

routing the printed pages of the at least one copy sensitive job to a bindexer having a plurality of bins using a unidirectional fill pattern prior to output; and routing the printed pages of any copy insensitive job to a bindexer having a plurality of bins using a bidirectional fill pattern prior to output.

2. The method as recited in claim 1, wherein the step of routing the printed pages of the at least one copy sensitive job includes beginning the fill pattern at a same bin for each sheet of the set.

3. An apparatus for processing copy sensitive and copy insensitive jobs in an electronic reprographic printing system comprising:

scanner means for scanning a plurality of sets of original documents which comprises at least one copy sensitive job to be printed;

storage means for electronically storing in memory images of the scanned documents;

converter means for converting the images to electronic pages for printing;

printer means for printing the electronic pages;

first routing means for routing the printed pages of the at least one copy sensitive job to a bindexer having a plurality of bins, said first routing means using a unidirectional fill pattern prior to output; and second routing means for routing the printed pages of any copy insensitive job to a bindexer having a plurality of bins, said second routing means using a bidirectional fill pattern prior to output.

4. The apparatus as recited in claim 3, wherein said first routing means beings the fill pattern at a same bin for each sheet of the set.

* * * * *